United States Patent [19]
Chang

[11] Patent Number: 5,345,253
[45] Date of Patent: Sep. 6, 1994

[54] TRACK BALL BASE STRUCTURE

[75] Inventor: Douglas Chang, Chung Ho, Taiwan

[73] Assignee: Behavior Tech Computer Corp., Taipei, Taiwan

[21] Appl. No.: 184,215

[22] Filed: Jan. 21, 1994

[51] Int. Cl.$^5$ ............................................. G09G 3/02
[52] U.S. Cl. .................................. 345/167; 345/157; 74/471 XY
[58] Field of Search ............... 343/167, 163, 161, 156, 343/157; 74/471 XY; 273/148 B, 438; 750/221

[56] References Cited

U.S. PATENT DOCUMENTS

| | | | |
|---|---|---|---|
| 4,538,476 | 9/1985 | Luque | 273/148 B |
| 4,658,666 | 4/1987 | Liu | 273/148 B |
| 4,952,919 | 8/1990 | Nippoldt | 345/167 |
| 5,208,736 | 5/1993 | Crooks et al. | 345/167 |

*Primary Examiner*—Alvin E. Oberley
*Assistant Examiner*—Regina Liang
*Attorney, Agent, or Firm*—Browdy and Neimark

[57] ABSTRACT

A track ball base structure comprises a single-piece body having a housing being composed of a plurality of standing plates in the top of the body with extruding portions in the upper end of which to get secure connection to a cover, a central circular recess with an opening bottom to hold a ball therein, a plurality of ball bearing holes evenly distributed around the upper rim of the circular panel in the housing with an inner rectangular plate inside the uppermost of each hole for admitting ball bearings therein and at the same time holding them in place, multiple pairs of locking means and slots in both sides of the body for locking the detecting system as well as fixing the body substantially onto an integrated circuit plate. The present invention is characterized by providing a track ball base structure in a non-assembly manner. Therefore, the number of component parts required for the track ball is reduced and clearly any damage occurring under interconnection for each part can be eliminated.

2 Claims, 5 Drawing Sheets

TRACK BALL BASE STRUCTURE

FIELD OF THE INVENTION

The present invention relates generally to a track ball base structure and more particularly to a single-piece body that provides several functions so as to reduce the number of component parts required for a track ball and give a more rigid base structure.

BACKGROUND OF THE INVENTION

Conventionally, a track ball assembly includes a cover, a ball, a housing to admit the ball, a plurality of ball bearings which are evenly distributed around an inner surface of the housing to support the ball, a seat having locking means thereon and an encoder wheel which is incorporated with a photoemitter as well as a photodetector together to form a detecting system to control the movement of a visual cursor on a monitor.

But some disadvantages exist in the aforementioned design. First, the thorough base structure assembly consisting of a housing and a seat to hold the encoder wheel and the ball is accomplished by linking several parts and may suffer damages from any mistake trying to interconnect each part. Second, it is known that the ball bearing is kept partially inside a hole in order to provide an anti-friction interface to support and permit the ball rotate freely in the housing. But, the problem is the whole ball bearing will be pushed down into the hole and then get jammed if acted upon by a excessive force. Third, the encoder wheel and the housing are connected together to the seat by spring biasing means while this arrangement is cumbersome. Finally, a block on which a photoemitter and a photodetector are located in pair is only releasably engaged with the seat.

SUMMARY OF THE INVENTION

Accordingly, it is a principal objective of the present invention to provide a track ball base structure that overcomes the problems within the aforementioned prior art.

It is another objective of the present invention to provide a track ball base structure which is a single-piece body and able to offer a housing, a seat and locking means simultaneously without the prior assembly manner. Therefore, the number of component parts required for the track ball is reduced and clearly the possible damages occurring under interconnection for each part can be eliminated.

It is still another objective of the present invention to provide a track ball base structure that in the uppermost of the hole which is used to keep the ball bearing, there is a rectangular plate so that the ball bearing can be held in place all the time.

In accordance with the present invention, the track ball base structure is a single-piece body including a housing which is composed of a plurality of standing plates in the top of the body so as to receive a ball and an encoder wheel, a central circular recess with an opening bottom for holding the ball, a plurality of ball bearing holes, and multiple pairs of locking means and slots in both sides of the body for locking the detecting system as well as fixing the body substantially onto an integrated circuit plate.

The above and other objectives, features and advantages of the invention will become readily apparent from the following detailed description thereof which is to be read in connection with the accompanying drawings.

DETAILED DESCRIPTION OF THE PREFERRED EMBODIMENT

Figure 1:
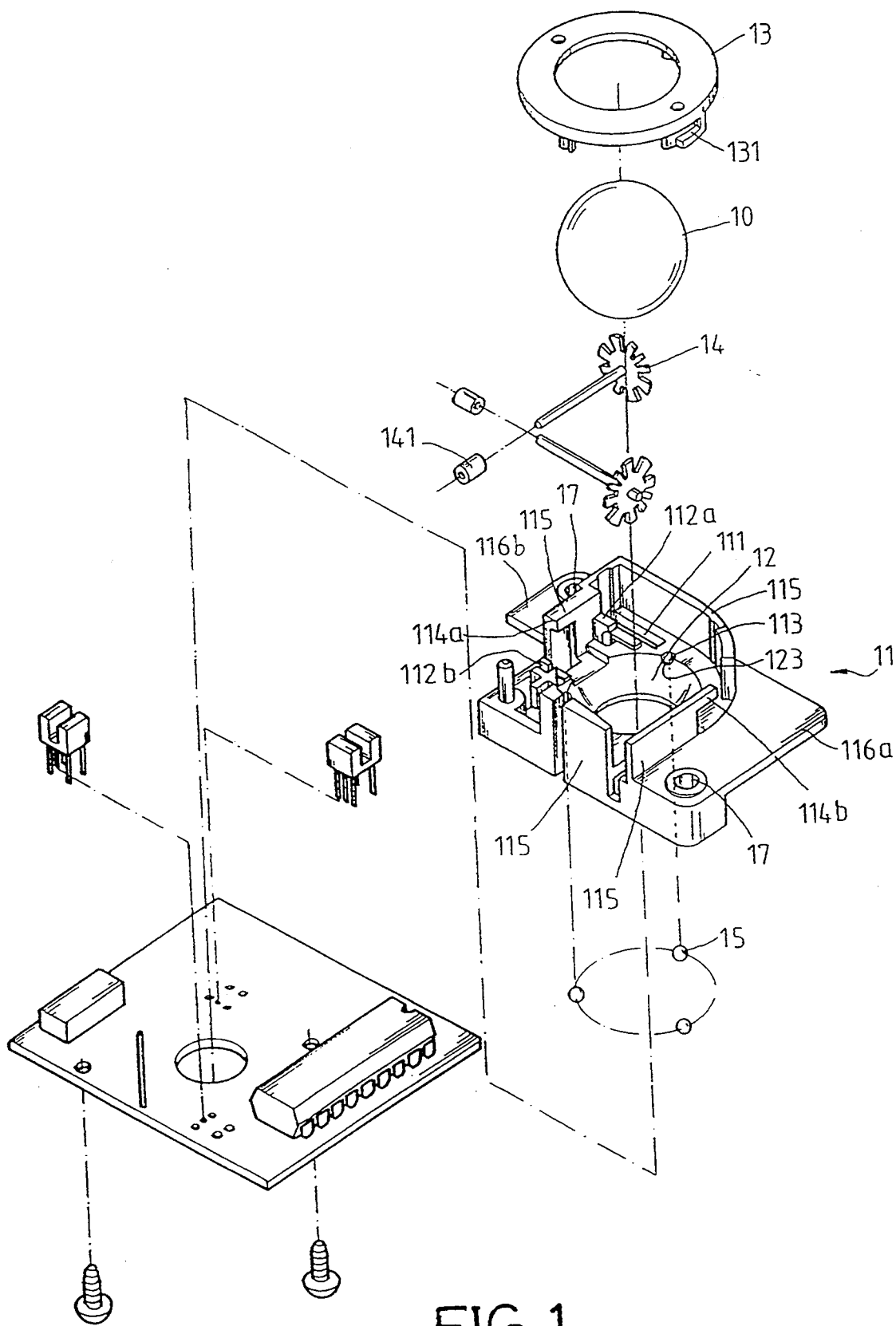
FIG. 1 is an exploded perspective view of a track ball along with an integrated circuit plate.

Referring to the drawings in detail and in particular to FIG. 1, wherein the components of a track ball shown in an exploded manner include a cover 13 with a locking slot 131; a ball 10 and two encoder wheels 14 being arranged perpendicular to each other and a rub tube 141 fitted to each encoder wheel 14 so that the encoder wheel 14 rotates in coincidence with the action of the ball 10 by direct contact with the rub tube 141 since the existence of interface frictions; a single-piece body 11 having a housing which is composed of a plurality of standing plates 115 in the top of the body 11 so as to receive the ball 10 and the encoder wheel 14, a central circular recess 12 with an opening bottom to hold the ball 10, a plurality of ball bearing holes 113 evenly distributed around the upper rim of the circular panel in the housing with an inner rectangular plate 123 inside the uppermost of each hole to admit ball bearings 15 and at the same time hold them in place, two strip slots 111 and the corresponding pairs of locking means 112a, 112b working together in order to hold the encoder wheel 14 wherein the holding condition can be enhanced due to a lateral gravity force from the ball 10 if sitting in the central circular recess 12, two locking holes 17 in platforms 116a, 116b outer to the housing through which the single-piece body 11 can be screwed up onto an integrated circuit plate by a bolt.

Figure 2:
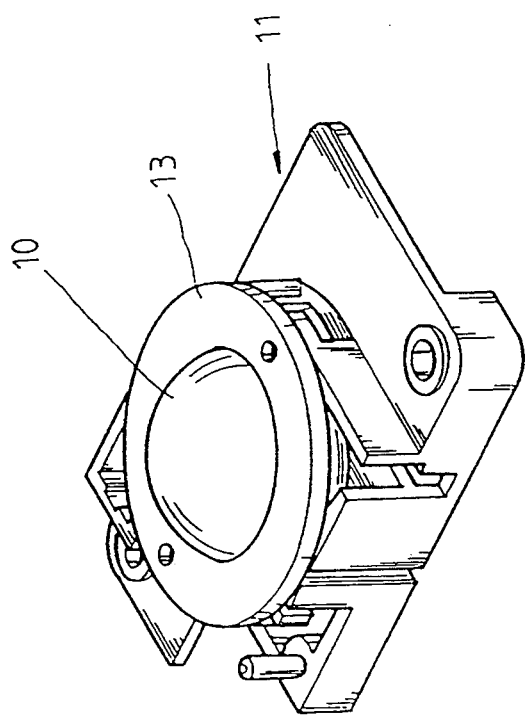
FIG. 2 is a perspective view of a track ball.

FIG. 2 is a perspective view of a track ball. Referring to FIG. 1 and 2, the track ball assembly is accomplished by using the cover 13 to confine the ball 10 between the cover 13 and the single-piece body 11 and then rotate the cover 13 slightly so that the locking slots 131 move into the extruding portions 114a, 114b in the upper end of standing plates 115 to get securely lock.

Figure 3:
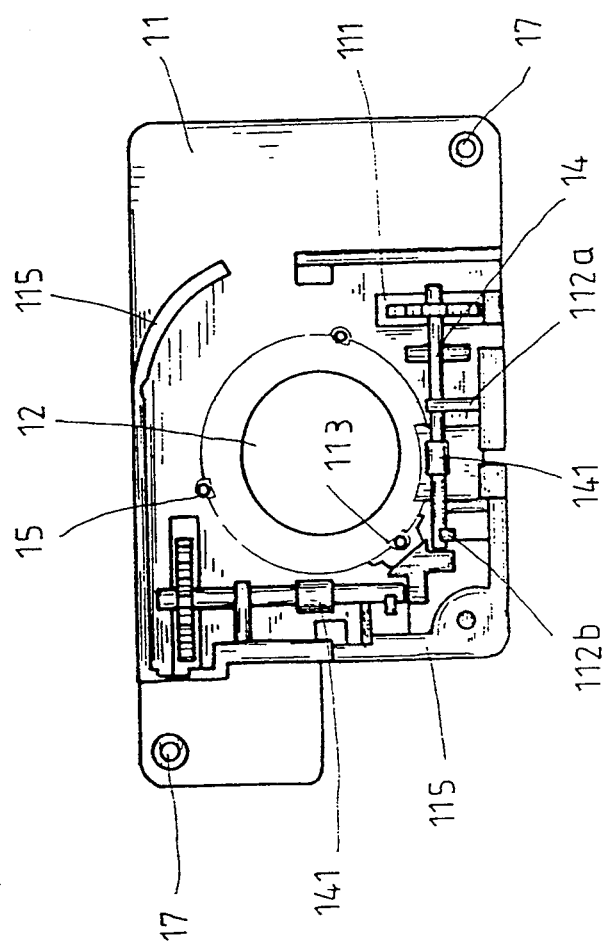
FIG. 3 is a top plan view of a track ball base structure along with the positioned encoder wheel and ball bearings.

Referring to FIG. 3, it is a top plan view of a track ball base structure along with the positioned encoder wheel 14 and ball bearings 15. This figure clearly shows the distribution of every portion in the ball track base structure of the present invention.

Figure 4:
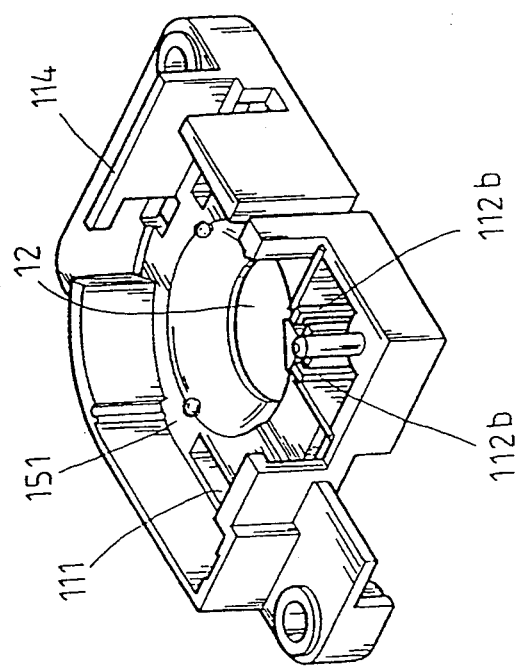
FIG. 4 is a perspective view of another preferred embodiment of the track ball base structure of the invention.

Referring to FIG. 4, it is another preferred embodiment of a track ball base structure of the present invention, wherein the couples of ball bearings 15 and ball bearing holes 113 are replaced by the same shape of bump 151 which is made of an anti-friction material so that a much simpler structure can be formed while the same function retained.

Figure 5:
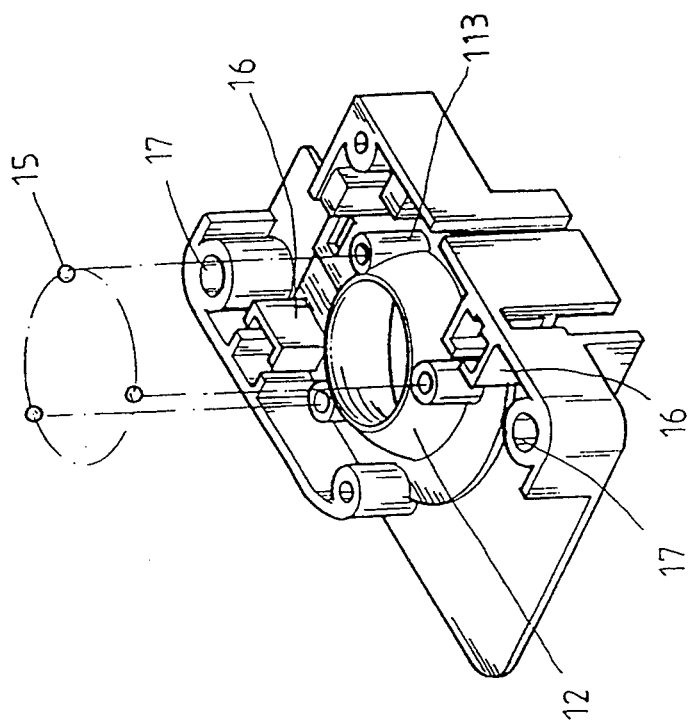
FIG. 5 is a bottom perspective view of a track ball base structure along with ball bearings.

Referring to FIG. 5, it is a bottom perspective view of a track ball base structure along with ball bearings wherein especially the bracket-shaped fixture 16 is provided to substantially engage with a block on which a photoemitter and a photodetector are located in pair incorporated with the encoder wheel 14 to control the movement of a visual cursor on a monitor.

Having described the specific preferred embodiments of the present invention with reference to the accompanying drawings, it will be appreciated that the present invention is not limited to that precise embodiments and that various changes and modifications can be effected therein by one of ordinary skill in the art without departing from the scope or spirit of the invention as defined by the appended claims.

What is claimed is:

1. A track ball base structure comprising a single-piece body having:

a housing to receive a ball and an encoder wheel therein being composed of a plurality of standing plates in the top of said body with extruding portions in the upper end of which to get secure connection to a cover; a central circular recess with an opening bottom to hold said ball therein; a plurality of ball bearing holes evenly distributed around the upper rim of the circular panel in said housing with an inner rectangular plate inside the uppermost of each said hole for admitting ball bearings therein and at the same time holding them in place; two strip slots and the corresponding pairs of locking means working together in order to hold said encoder wheel wherein the holding condition can be enhanced due to a lateral gravity force from said ball if sitting in said central circular recess; two locking holes in platforms outer to said housing through which said single-piece body can be screwed up onto an integrated circuit plate by a bolt; a bracket-shaped fixture in the bottom of said single-piece body being provided to substantially engage with a block on which a photoemitter and a photodetector are located in pair.

2. A track ball base structure according to claim 1, wherein the couples of said ball bearings and said ball bearing holes are replaced by the same shape of bump which is made of anti-friction material so that a much simpler structure can be formed while the same function retained.

* * * * *